United States Patent
Hyun et al.

(10) Patent No.: US 9,159,320 B2
(45) Date of Patent: Oct. 13, 2015

(54) ENDPOINT DETECTION APPARATUS FOR SOUND SOURCE AND METHOD THEREOF

(71) Applicant: Samsung Electronics Co., Ltd., Suwon-si (KR)

(72) Inventors: Kyung Hak Hyun, Suwon-si (KR); Ki Beom Kim, Seongnam-si (KR); Ki Hoon Shin, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 239 days.

(21) Appl. No.: 13/788,097

(22) Filed: Mar. 7, 2013

(65) Prior Publication Data

US 2013/0238335 A1   Sep. 12, 2013

(30) Foreign Application Priority Data

Mar. 6, 2012  (KR) .................. 10-2012-0023078

(51) Int. Cl.
 G10L 15/22 (2006.01)
 G10L 21/0208 (2013.01)

(52) U.S. Cl.
 CPC .............. *G10L 15/22* (2013.01); *G10L 21/0208* (2013.01)

(58) Field of Classification Search
 CPC ...................................... G10L 15/22
 USPC ........................... 704/248; 381/119
 See application file for complete search history.

(56) References Cited

U.S. PATENT DOCUMENTS

| 2005/0256711 | A1  | 11/2005 | Lahti |
| 2007/0288238 | A1  | 12/2007 | Hetherington et al. |
| 2009/0034756 | A1* | 2/2009  | Volker et al. ............... 381/119 |

FOREIGN PATENT DOCUMENTS

KR   10-2004-0061070   7/2004

OTHER PUBLICATIONS

Extended European Search Report dated May 31, 2013 issued in European Application No. 13158033.4.
Eric A. Lehmann et al., "Particle Filter with Integrated Voice Activity Detection for Acoustic Source Tracking", EURASIP Journal on Advances in Signal Processing, vol. 2007, Article ID 50870, 2007, 11 pages.
Douglas E. Sturim et al., "Tracking Multiple Talkers Using Microphone-Array Measurements", XP10226212A, 1997, pp. 371-374.
Maurice Fallon et al., "Multi Target Acoustic Source Tracking Using Track Before Detect", IEEE Workshop of Applications of Signal Processing to Audio and Acoustics, 2007, pp. 102-105.

* cited by examiner

*Primary Examiner* — Qian Yang
(74) *Attorney, Agent, or Firm* — Staas & Halsey LLP

(57) ABSTRACT

An apparatus for detecting endpoints of sound signals when sound sources vocalized from a remote site are processed even if a plurality of speakers exists and an interference sound being input from a direction different from a direction of one speaker, and a method thereof, wherein in an environment in which a plurality of sound sources exists, the existence and the length of the sound source being input according to each direction is determined and the endpoint is found, thereby improving the performance of the post-processing, and speech being input from a direction other than a direction of speech from a speaker vocalized at a remote area from a sound source collecting unit is distinguished while the speech from the speaker is being recorded, thereby enabling a remote sound source recognition without restriction on the installation region of a microphone.

17 Claims, 12 Drawing Sheets

FIG. 4

| Deg | t=1 | t=2 | t=3 | t=4 | t=5 | t=6 | t=7 | t=8 | t=9 |
|---|---|---|---|---|---|---|---|---|---|
| -90 | 0 | 0 | 0 | 0 | 0 | 0 | 0 | 0 | 0 |
| ⋮ | 0 | 0 | 0 | 0 | 0 | 0 | 0 | 0 | 0 |
| -10 | 0 | 0 | 0 | 1 | 2 | 3 | 4 | 0 | 0 |
| ⋮ | 0 | 0 | 0 | 0 | 0 | 0 | 0 | 0 | 0 |
| +10 | 0 | 0 | 0 | 1 | 2 | 3 | 4 | 0 | 0 |
| ⋮ | 0 | 0 | 0 | 0 | 0 | 0 | 0 | 0 | 0 |
| +90 | 0 | 0 | 0 | 0 | 0 | 0 | 0 | 0 | 0 |

FIG. 7

| Deg | t=1 | t=2 | t=3 | t=4 | t=5 | t=6 | t=7 | t=8 | t=9 | t=10 | t=11 | t=12 | t=13 | t=14 | t=15 | t=16 | t=17 | t=18 | t=19 |
|-----|-----|-----|-----|-----|-----|-----|-----|-----|-----|------|------|------|------|------|------|------|------|------|------|
| -90 | 0 | 0 | 0 | 0 | 0 | 0 | 0 | 0 | 0 | 0 | 0 | 0 | 0 | 0 | 0 | 0 | 0 | 0 | 0 |
| .. | 0 | 0 | 0 | 0 | 0 | 0 | 0 | 0 | 0 | 0 | 0 | 0 | 0 | 0 | 0 | 0 | 0 | 0 | 0 |
| -25 | 0 | 0 | 0 | 0 | 0 | 1 | 2 | 3 | 4 | 5 | 6 | 0 | 0 | 0 | 0 | 0 | 0 | 0 | 0 |
| .. | 0 | 0 | 0 | 0 | 0 | 0 | 0 | 0 | 0 | 0 | 0 | 0 | 0 | 0 | 0 | 0 | 0 | 0 | 0 |
| +15 | 0 | 0 | 0 | 0 | 0 | 0 | 1 | 2 | 3 | 4 | 5 | 6 | 0 | 0 | 0 | 0 | 0 | 0 | 0 |
| .. | 0 | 0 | 0 | 0 | 0 | 0 | 0 | 0 | 0 | 0 | 0 | 0 | 0 | 0 | 0 | 0 | 0 | 0 | 0 |
| +90 | 0 | 0 | 0 | 0 | 0 | 0 | 0 | 0 | 0 | 0 | 0 | 0 | 0 | 0 | 0 | 0 | 0 | 0 | 0 |

ENDPOINT DETECTION APPARATUS FOR SOUND SOURCE AND METHOD THEREOF

CROSS-REFERENCE TO RELATED APPLICATIONS

This application claims the priority benefit of Korean Patent Application No. 10-2012-0023078, filed on Mar. 6, 2012 in the Korean Intellectual Property Office, the disclosure of which is incorporated herein by reference.

BACKGROUND

1. Field

The following description relates to an apparatus for detecting endpoints of sound sources and a method thereof, and more particularly, to an apparatus for detecting endpoints of sound sources according to each direction from a plurality of sound sources and a method thereof.

2. Description of the Related Art

In general, in various fields related to sound-source technologies, such as speech recognition, speaker recognition, and video calling, a disturbing sound or interfering sound in addition to a sound source of a speaker exists in a surrounding environment in which the sound source is input.

In such an environment having various sound sources, in order to detect the sound source of the speaker, sound source endpoint detection is used to search for a region in which a sound source exists. For example, in order to control a television with a speech command, a start point and an endpoint of a signal having a command indicating "Turn on the TV" or "Turn off the TV" is recognized to transmit sound source data corresponding to the command to a sound source recognition apparatus. Such a function is referred to as sound source endpoint detection.

The sound source endpoint detection is designed to detect a point at which a sound source starts and a point at which the sound source ends from a signal including the sound source, and is configured to distinguish a sound source section from a noise section in a signal being input from a microphone such that only the sound section is processed and unnecessary information at the noise section is removed, thereby reducing unnecessary computation and enabling an efficient use of a memory while improving the memory.

The sound source endpoint detection currently equipped on most sound source recognition apparatuses uses a single microphone, and energy-related information input into the microphone is used as a main factor to distinguish the sound source section from the noise section. Because the energy or entropy of a speech signal is increased when speech starts to be vocalized, a point having an energy or entropy at a threshold value or above is determined as a start point of the sound source signal, and the opposite point is determined as an endpoint of the sound source signal.

Alternatively, the sound source endpoint detection may be performed by use of the energy at a frequency band at which a sound source exists or other sound characteristics, in consideration of the change in the voice frequency band.

However, such conventional technology of sound source endpoint detection is configured to extract sound characteristic from a sound source signal input through a single microphone to detect the boundary of the sound. Accordingly, sound having frequency characteristics that are distinguished from those of a sound source, for example, stationary noise, may be detected to some extent, but music input in a predetermined direction or sound including speech from another speaker is not easily removed only through a signal processing method. In particular, as for the sound including speech from a plurality of speakers, the endpoint detection is not achievable only with the frequency characteristics.

SUMMARY

Therefore, it is an aspect of the present disclosure to provide an apparatus for detecting endpoints of sound source of object speakers when a sound source vocalized at a remote site is processed, even if a plurality of speakers exists and an interference sound input from a direction different from a direction of one speaker exists, and a method thereof.

Additional aspects of the disclosure will be set forth in part in the description which follows and, in part, will be apparent from the description, or may be learned by practice of the disclosure.

In accordance with an aspect of the present disclosure, an apparatus for detecting endpoints of a plurality of sounds signals from a plurality of sound sources includes a plurality of microphones, a sound source position detecting unit, a sound source position change determination unit, a sound source maintenance time calculating unit, and an endpoint determination unit. The plurality of microphones may be configured to receive sound source signals from a plurality of sound sources. The sound source position detecting unit may be configured to detect positions of the plurality of sound sources from the sound source signals received through the plurality of microphones. The sound source position change determination unit may be configured to determine a change in position of the sound source according to each direction by reading the positions of the plurality of sound sources detected through the sound source position detecting unit. The sound source maintenance time calculating unit may be configured to calculate a sound source maintenance time of the sound source at a predetermined position by reading the positions of the plurality of sound sources detected through the sound source position detecting unit. The endpoint determination unit may be configured to determine endpoints of the plurality of sound sources by use of the sound source maintenance time calculated by the sound source maintenance time calculating unit and the change in position of the sound source according to each direction determined by the sound source position change determination unit.

The plurality of sound sources may include speech from a speaker and a surrounding noise.

The speech from the speaker may include speech from a plurality of speakers.

The sound source position detecting unit may detect a position and number of the sound sources being input according to each direction from an environment in which the plurality of sound sources exists.

The apparatus may further include a sound source position storage unit configured to store the position and number of the sound sources detected through the sound source position detecting unit together with time information.

The sound source position storage unit may store a position tracking result of each sound source about an existence and a length of the sound source being input according to each direction through the detection of the positions of the plurality of sound sources.

The sound course position change determination unit may monitor a change in an angle of the sound source at a predetermined time interval by reading the position tracking result of the each sound source being stored in the sound source position storage unit, and may determine a change in the number of sound sources or a generation or an extinction of a sound source at a predetermined position.

The sound maintenance time calculating unit may monitor a change in an angle of the sound source at a predetermined time interval by reading the position tracking result of each sound source being stored in the sound source position storage unit, and if the angle is changed, may calculate a current time and a sound source maintenance time during which the angle is maintained.

The endpoint determination unit may determine the endpoint of each sound source by interpreting a termination and a length of a sound source in a predetermined direction by use of a time, during which the sound source is maintained, from the current time.

In accordance with an aspect of the present disclosure, a method of detecting endpoints of a plurality of sounds signals from a plurality of sound sources is as follows. Sound source signals from a plurality of sound sources may be received from a plurality of microphones. Positions of the plurality of sound sources may be detected from the received sound source signals. A change in an angle of the sound source may be monitored at a predetermined time interval by reading the positions of the plurality of sound sources detected. If the angle is changed, a current time and a time during which the angle is maintained may be calculated. The endpoints of the plurality of sound sources may be determined by use of a time, during which a sound source in a predetermined direction is maintained, from the current time.

The detecting of the positions of the plurality of sound sources may be achieved by performing the following. A position and number of sound sources being input according to each direction from an environment in which the plurality of sound sources exists may be detected.

The method may be achieved by further performing the following. The detected position and number of the sound sources may be stored together with time information.

The method may be achieved by further performing the following. A position tracking result of each sound source about an existence and a length of the sound source being input according to each direction may be stored by use of the position and number of the plurality of sound sources being stored together with the time information.

The monitoring of the change in the angle may be achieved by performing the following. A change in an angle of the sound source may be monitored at a predetermined time interval by reading the stored position tracking result of the each sound source. A change in the number of the sound sources or a generation or an extinction of a sound source at a predetermined position may be determined.

The calculating of the time during which the angle of the sound source is maintained may be achieved by performing the following. If the angle of the sound source is changed, the current time and the time during which the angle of the sound source is maintained may be calculated.

The determining of the endpoints of the plurality of sound sources may be achieved by performing the following. The endpoint of each sound source may be determined by interpreting a termination and a length of a sound source by use of a time, during which a sound source in a predetermined direction is maintained, from the current time.

In accordance with an aspect of the present disclosure, a method for distinguishing a first sound signal from a second sound signal may include receiving the first sound signal and the second sound signal using a plurality of microphones, identifying a start time of the first sound signal, determining a position of a source of the first sound signal, tracking the position of the source of the first sound signal at predetermined time intervals, identifying an end time of the first sound signal based on the tracked position of the source of the first sound signal, and distinguishing the first sound signal from the second sound signal based on the start time, end time, and tracked position of the first sound signal.

As described above, according to an apparatus for detecting endpoints of a plurality of sounds signals from a plurality of sound sources and a method thereof, in an environment having various sound sources, the existence and the length of the sound source being input by each direction are recognized and thus the sound source may be detected and the endpoint may be found, thereby improving the performance of a post processing (the sound source separation, the noise cancellation, the speech characteristic extraction, and the speech recognition). In particular, speech being input from a direction other than a direction of speech from a speaker vocalized at a remote area from a sound source collecting unit is distinguished while the speech from the speaker is being recorded and thus the endpoint of the speech may be detected, thereby enabling a remote sound source recognition without restriction on the installation region of a microphone.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 3A, 3B, and 3C illustrate an example of separating a sound source by use of the endpoint detection of the plurality of sound sources in accordance with an embodiment of the present disclosure, in which FIG. 3A is a view illustrating a microphone signal when speech from two speakers is recorded, FIG. 3B is a view illustrating a signal having speech from a first speaker removed therefrom, and FIG. 3C is a view illustrating a signal having speech from a second speaker removed therefrom.

FIG. 4 is a view illustrating a table that stores the positions and the number of sound sources of the two speakers shown in FIGS. 3A to 3C together with time information.

FIGS. 5A and 5B illustrate an example of separating a sound source by use of a conventional endpoint detection of a plurality of sound sources, in which FIG. 5A is a view illustrating a microphone signal when speech from two speakers and surrounding noise is recorded, and FIG. 5B is a view illustrating a signal at which the speech from the two speakers is not separated.

FIGS. 6A, 6B, and 6C illustrate an example of separating a sound source by use of the endpoint detection of the plurality of sound sources in accordance with an embodiment of the present disclosure, in which FIG. 6A is a view illustrating a microphone signal when speech from two speakers and surrounding noise is recorded, FIG. 6B is a view illustrating a signal having speech from a first speaker removed therefrom, and FIG. 6C is a view illustrating a signal having speech from a second speaker removed therefrom.

FIG. 7 is a view illustrating a table of a sound source position storage unit that stores a position tracking result by use of the positions, the number of the two speakers and time information.

DETAILED DESCRIPTION

Figure 1:
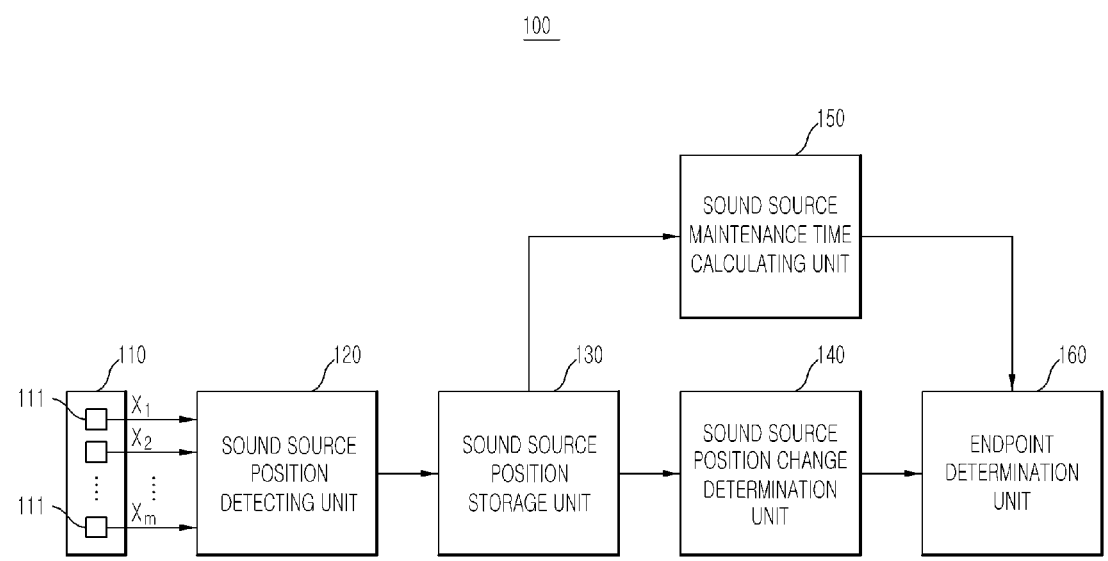
FIG. 1 is a block diagram illustrating a sound source endpoint detection apparatus to detect endpoints of a plurality of sound sources in accordance with an embodiment of the present disclosure.

Reference will now be made in detail to the embodiments of the present disclosure, examples of which are illustrated in the accompanying drawings, wherein like reference numerals refer to like elements throughout.

FIG. 1 is a block diagram illustrating a sound source endpoint detection apparatus to detect endpoints of a plurality of sound sources in accordance with an embodiment of the present disclosure.

Referring to FIG. 1, the sound source endpoint detecting apparatus 100 in accordance with an embodiment of the present disclosure includes a sound source collecting unit 110, a sound source position detecting unit 120, a sound source position storage unit 130, a sound source position change determination unit 140, a sound source maintenance time calculating unit 150, and an end point determination unit 160.

The sound source collecting unit 110 represents a microphone array configured to collect sound sources from an environment where a plurality of sound sources exists, such as an environment where a plurality of speakers exists or other disturbing sound or surrounding interference sound exists in addition to the speakers, for example.

The microphone array includes a plurality of microphones 111, for example, at least two microphones, and the respective microphones 11 are disposed while being spaced apart from each other to receive sound source signals $X_1, X_2, \ldots$ and $X_m$. In this manner, the position of the sound source is detected through the difference of the signal arrival between the microphones 111 by a position detection algorithm for a plurality of sound sources.

For example, the plurality of microphones 111 may represent a mobile terminal, such as a cellular phone, a personal digital assistant (PDA), and a notebook PC, and may represent a medium capable of replaying or storing an image, such as a television or a camcorder. That is, the present disclosure may be applied to any apparatus provided with at least two microphones 111.

The sound source position detecting unit 120 is an apparatus to detect the positions of a plurality of sound sources from the sound source signals $X_1, X_2, \ldots$ and $X_m$ being input to the respective microphones 111 of the sound source collecting unit 110, and may represent a Multiple Sound Source Localizer that detects the positions of the respective source sounds through various position detection algorithms for a plurality of sound sources, such as a Steered Beamformer, and a Multiple Signal Classification (MUSIC), for example.

In general, in order to determine the position of the sound source, two or more microphone signals existing at different positions are required. One of the most general approaches involves a position detection algorithm for a plurality of sound sources that estimates the angle of the sound source by use of the time difference of the signal arrival from the sound signals $X_1, X_2, \ldots$ and $X_m$ being input to the respective microphones 111 and by use of the distance between the microphones 111.

The sound source position storage unit 130 is an apparatus to store the positions and the number of the plurality of sound sources detected through the sound source position detecting unit 120 together with time information, and the sound source position storage unit 130 may represent a Direction Recorder that stores a position tracking result of each sound source about an existence and a length of the sound source being input according to each direction through the position detection for the plurality of sound sources.

The sound source position change determination unit 140 is an apparatus to determine the change in the position of the sound source according to each direction by reading the position tracking results about the plurality of sound sources being stored in the sound source position storage unit 130, and the sound source position change determination unit 140 may represent a Direction Decision Maker that determines a change in the number of sound sources or a generation or an extinction of a sound source at a predetermined position by monitoring a change in an angle at a predetermined time interval (a sampling time or a multiple of a sampling time).

The sound source maintenance time calculating unit 150 is an apparatus to calculate the occurrence time of a sound source in a predetermined position by reading the position tracking results about the plurality of sound sources stored in the sound source position storage unit 130, and the sound source maintenance time calculating unit 150 may represent a Sound Length Calculator that monitors a change in an angle at a predetermined time interval (a sampling time or a multiple of a sampling time), and if the angle is changed, calculates a current time and a sound source maintenance time during which the angle is maintained.

The endpoint determination unit 160 is an apparatus to determine a section subject to a post-processing, such as a section provided to the sound source recognition apparatus, for example, in consideration of the current time, the sound source maintenance time calculated by the sound source maintenance time calculating unit 150, and the positions and the number of the plurality of sound sources stored in the sound source position storage unit 130. The endpoint determination unit 160 may represent an Endpoints Detector that determines the endpoint of each sound source by interpreting a termination and a length of a sound source by use of a time during which a sound in a predetermined direction is maintained from the current time.

In addition, the endpoint determination unit 160, in a case that a predetermined list of speech commands is designated, may determine the endpoint using the length of the speech command.

Hereinafter, an apparatus for detecting endpoints of a plurality of sound sources in accordance with an embodiment of the present disclosure, and a method thereof will be described.

Figure 2:
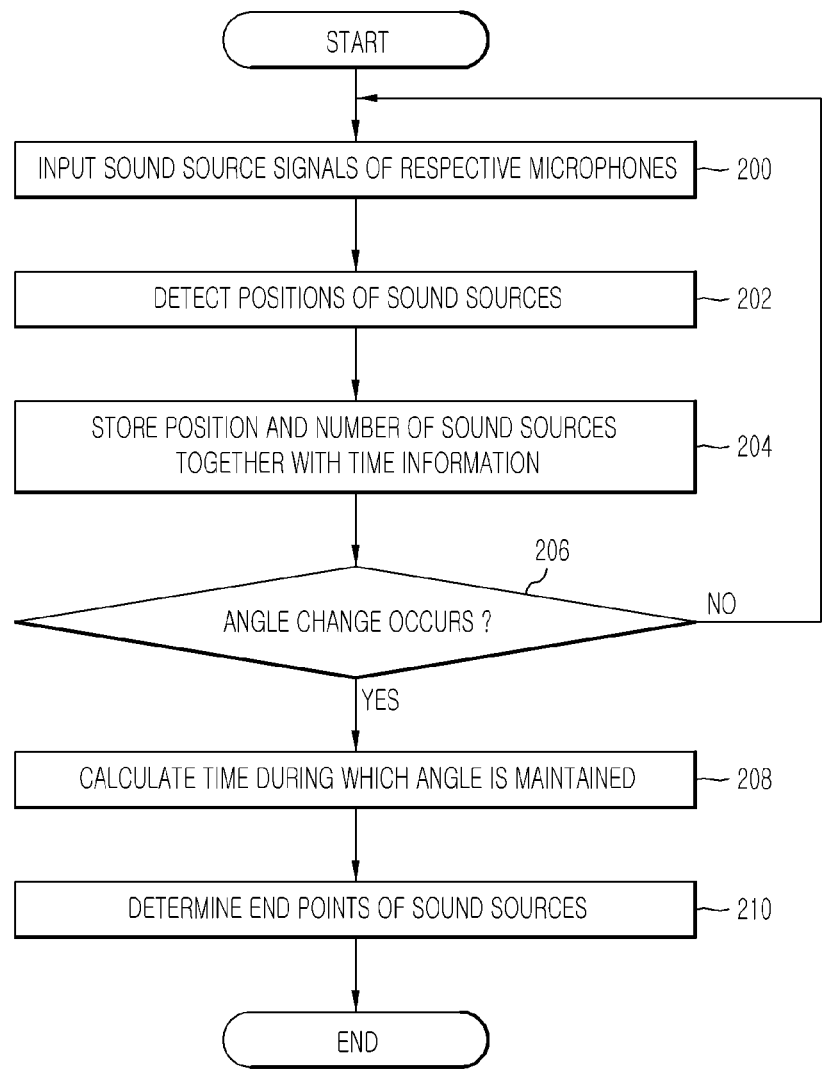
FIG. 2 is a flow chart illustrating a method of detecting endpoints of a plurality of sound sources in accordance with an embodiment of the preset disclosure.

FIG. 2 is a flow chart illustrating a method of detecting endpoints of a plurality of sound sources in accordance with an embodiment of the preset disclosure.

Referring to FIG. 2, the sound source collecting unit 110 receives the sound source signals $X_1, X_2 \ldots$ and $X_m$ from a plurality of microphones 111, for example, at least two of microphones 111, from an environment in which a plurality of sound sources exists, that is, an environment in which a plurality of speakers exists or other interrupting sound or a surrounding interference sound exists in addition to the speaker (operation 200). Each of the microphones 111 detects a sound wave of the sound source and generates an electric signal corresponding to the sound wave. The electric signal is referred to as a sound source signal.

As the sound source signals $X_1, X_2 \ldots$ and $X_m$ are input through the respective microphones 111 at the sound source collecting unit 110, the sound source position detecting unit 120 receives the sound source signals $X_1, X_2 \ldots$ and $X_m$ input to the respective microphones 111 to detect the positions of the plurality of sound sources (operation 202).

The sound source position detecting unit 120 detects the positions and the number of the sound sources being input according to each direction from an environment where a plurality of sound sources exists, through various position detection algorithms for a plurality of sound sources, such as a Steered Beamformer, and a Multiple Signal Classification (MUSIC), for example.

As described above, the positions of the number of the sound sources detected through the position detection for the plurality of sound sources are stored in the sound source position storage unit 130 together with time information (operation 204).

Accordingly, the sound source position storage unit 130 may store a position tracking result of each sound source about an existence and a length of the sound source being input according to each direction, by use of the positions and the number of the plurality of sound sources that are stored together with the time information.

Accordingly, the sound source position change determination unit 140 monitors a change in an angle at a predetermined time interval (a sampling time or a multiple of a sampling time) by reading the position tracking results of the plurality of sound sources being stored in the sound source position storage unit 130, and determines whether an angle is changed (operation 206).

If a result of determination of operation 206 is that an angle is not changed, the sound source position change determination unit 140 determines that a change in the position of the sound source according to each direction has not occurred, and the control mode returns to operation 200 to perform the following operations in which the sound signals are input from the respective microphones 111 at the environment in which the plurality of sound sources exists.

If a result of determination of operation 206 is that an angle is changed, the sound source position change determination unit 140 determines that a change in the position of the sound source according to each direction has occurred, and the sound source maintenance time calculating unit 150 calculates a current time and a sound source maintenance time during which the angle is maintained, and transmits the calculated current time and sound source maintenance time to the endpoint determination unit 160 (operation 208).

Accordingly, the endpoint determination unit 160 determines a point at which a sound source starts and a point at which the sound source terminates in the environment in which the plurality of sound sources exists, in consideration of the time, during which a sound source in a predetermined direction is maintained, from the current time (operation 210).

As described above, the existence and the length of a sound source according to each may be determined by use of the positions and the number of the respective sound sources being detected through the position detection for a plurality of sound sources. Accordingly, in an environment in which a plurality of sound sources exists, that is, an environment in which a plurality of speakers or other interrupting sound or a surrounding interference sound exists in addition to the speakers, the sound source according to each direction is detected and the endpoint is found, thereby improving the performance of the post-processing (the sound source separation, the noise cancellation, the speech characteristic extraction, and the speech recognition). In particular, speech being input from a direction other than a direction of speech from a speaker vocalized at a remote area from a sound source collecting unit 110 is distinguished while the speech from the speaker is being recorded, thereby enabling a remote sound source recognition without restriction on the installation region of a microphone 111.

In addition, when a plurality of pieces of sound sources exists, a separation method, such as Independent Component Analysis (ICA), for example, may be used to separate the sound sources according to each direction. In this case, if the position information and the start point and end point information of the sound source is given, an appropriate initial value is used when a separation filter is adapted, thereby achieving a stable performance of the sound separation, and hereinafter, this will be described with reference to FIGS. 3A to 3C and FIG. 4.

Figure 3A:
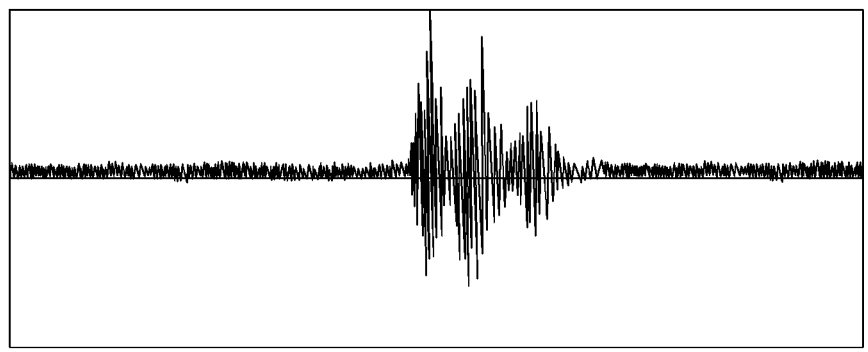
Figure 3B:
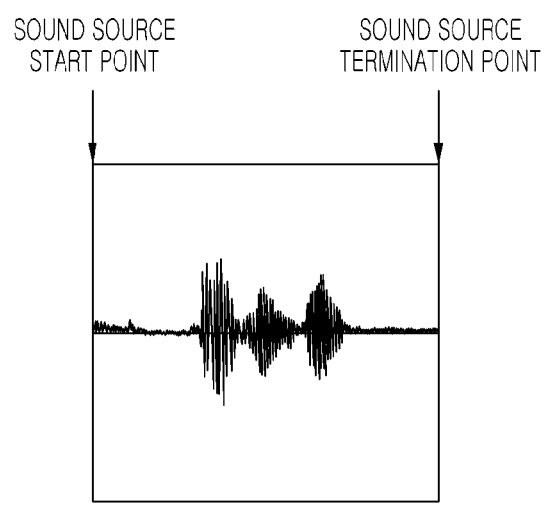
Figure 3C:
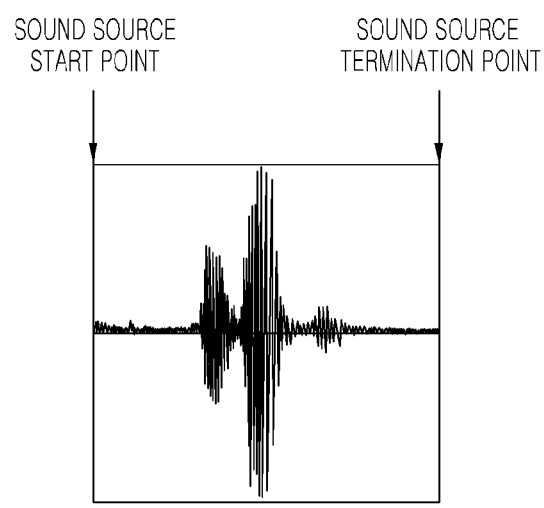

FIGS. 3A to 3C illustrate an example of separating a sound source by use of the endpoint detection of the plurality of sound sources in accordance with an embodiment of the present disclosure, in which FIG. 3A is a view illustrating a microphone signal when speech from two speakers, having angles of +10 degrees and −10 degrees, respectively, is recorded, FIG. 3B is a view illustrating a signal having speech from a first speaker corresponding to an angle of +10 degrees removed therefrom, and FIG. 3C is a view illustrating a signal having speech from a second speaker corresponding to an angle of −10 degrees removed therefrom.

Referring to FIGS. 3A to 3C, in an environment in which a plurality of sound sources exists, that is, an environment in which a plurality of speakers exist or other disturbing sound or a surrounding interference sound exists in addition to the speakers, the positions of the plurality of sound sources, the point of time at which the sound source is vocalized, and the length of the sound source are predicted by use of the suggested endpoint detection method for the sound source.

Thereafter, a beamforming is initialized in a predicted direction, and by use of information about a section at which the sound source is vocalized, the beamforming is adapted only during the section at which the sound source is vocalized, and a separation filter using the adapted beamforming is applied.

As a result, through the sound source separation using the endpoint detection for the plurality of sound sources, two sound source signals having similar lengths are proven to be input at a similar point of time.

FIG. 4 is a view illustrating a table that stores the positions and the number of sound sources of the two speakers shown in FIGS. 3A to 3C together with time information.

Referring to FIG. 4, the directions in which the sound sources of the two speakers exist are +10 degrees and −10 degrees, respectively, and the first speaker corresponding to an angle of +10 degrees and the second speaker corresponding to an angle of −10 degrees have a sound source end point including a sound source start point, at which a change of an angle occurs, at t=4, and a sound source termination point, at which a change of an angle occurs, at t=7.

Hereinafter, the method of detecting the positions of the plurality of sound sources, the point of time at which the sound source is vocalized, and the length of the sound source from an environment in which a plurality of sound sources exists, that is, an environment in which two speakers and surrounding noise such as music exist, by use of the endpoint detection method for the sound source in accordance with an embodiment of the present disclosure, will be described with reference to FIGS. 5A to 5C and FIG. 6.

Figure 5A:
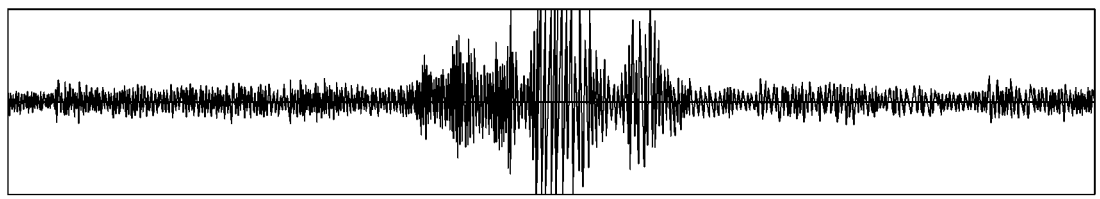
Figure 5B:
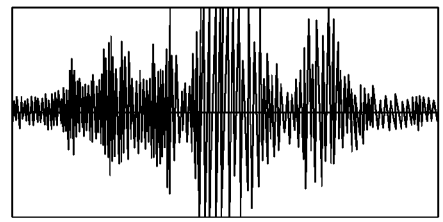

FIGS. 5A and 5B illustrate an example of separating a sound source by use of a conventional endpoint detection of a plurality of sound sources, in which FIG. 5A is a view illustrating a microphone signal when speech from two speakers, having an angle of −25 degrees and an angle of +15 degrees, respectively, and surrounding noise (music) is recorded, and FIG. 5B is a view illustrating a signal at which the speech from the two speakers is not separated.

Referring to FIGS. 5A and 5B, in an environment in which a plurality of sound sources exists, that is, an environment in which two speakers and a surrounding noise, such as music, exist, the positions of the plurality of sound sources, the point of time at which the sound source is vocalized, and the length of the sound source are predicted by use of a conventional endpoint detection method for the sound sources.

Thereafter, a beamforming is initialized in a predicted direction, and by use of information about a section at which the sound source is vocalized, the beamforming is adapted only during the section at which the sound source is vocalized, and a separation filter using the adapted beamforming is applied.

As a result, as shown in FIG. 5B, because the positions of the sound sources of the two speakers, the point of time at which the sound source is vocalized and the length of the sound source are proven to fail for recognition in an environment in which a plurality of sound sources exists, that is, an environment in which a plurality of speakers and a surrounding interference sound, such as music, the speech from the two speakers fails to be separated.

Figure 6A:
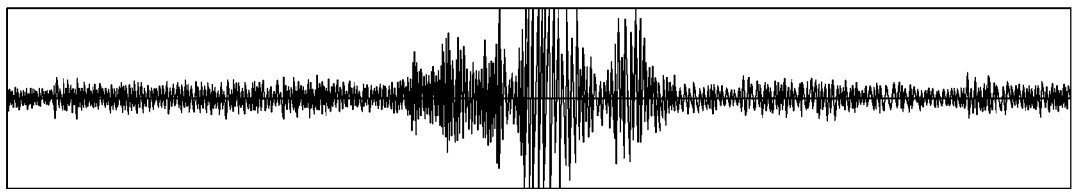
Figure 6B:
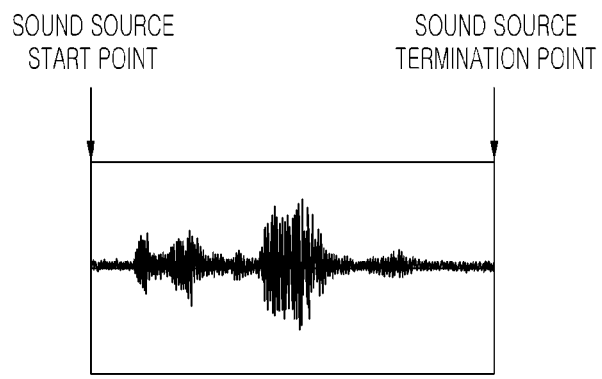
Figure 6C:
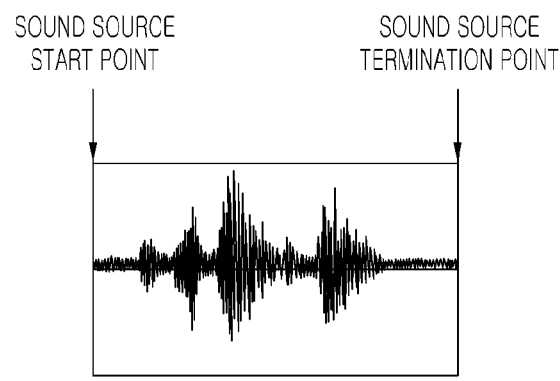

FIGS. 6A to 6C illustrate an example of separating a sound source by use of the endpoint detection of the plurality of sound sources in accordance with an embodiment of the present disclosure, in which FIG. 6A is a view illustrating a microphone signal when speech from two speakers, having an angle of −25 degrees and an angle of +15 degrees, respectively, and surrounding noise (music) is recorded, FIG. 6B is a view illustrating a signal having the speech from the first speaker corresponding to the angle of −25 degrees removed therefrom, and FIG. 6C a view illustrating a signal having the speech from the second speaker corresponding to the angle of +15 degrees removed therefrom.

Referring to FIGS. 6A to 6C, in an environment in which a plurality of sound sources exists, that is, an environment in which two speakers and a surrounding interference sound, such as music, exist, the positions of the plurality of sound sources, the point of time at which the sound source is vocalized, and the length of the sound source are predicted by use of the suggested endpoint detection method for the sound sources.

Thereafter, a beamforming is initialized in a predicted direction, and by use of information about a section at which the sound source is vocalized, the beamforming is adapted only during the section at which the sound source is vocalized, and a separation filter using the adapted beamforming is applied.

As a result, through the sound source separation using the endpoint detection for the plurality of sound sources, two sound source signals having different lengths are proven to be input at a time interval.

FIG. 7 is a view illustrating a table of the sound source position storage unit 130 that stores the position tracking result by use of the positions, the number of the two speakers (−25 degrees and +15 degrees) and time information.

Referring to FIG. 7, the directions in which the sound sources of the two speakers exist are −25 degrees and +15 degrees, respectively, and the first speaker corresponding to an angle of −25 degrees has a sound source end point including a sound source start point, at which a change of an angle occurs, at t=6, and a sound source termination point, which a change of an angle occurs, at t=11. The second speaker corresponding to an angle of +15 degrees has a sound source end point including a sound source start point, at which a change of an angle occurs, at t=7, and a sound source termination point, which a change of an angle occurs, at t=12.

Although the above description in accordance with an embodiment of the present disclosure has been made in relation that two speakers and music exist in addition to the two speakers as an example, the present disclosure is not limited thereto. The position detection of the plurality of sound sources and the endpoint determination for each sound source may be applied even if the two speakers and various noises including music exist.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus for detecting endpoints of a plurality of sound signals from a plurality of sound sources, the apparatus comprising:
   a plurality of microphones configured to receive the plurality of sound signals from the plurality of sound sources;
   a sound source position detecting unit configured to detect positions of the plurality of sound sources from the sound signals received through the plurality of microphones;
   a sound source position change determination unit configured to determine a change in position of the sound sources according to each direction by reading the positions of the plurality of sound sources detected through the sound source position detecting unit;
   a sound source maintenance time calculating unit configured to calculate a sound source maintenance time of the sound sources at a specific position by reading the positions of the plurality of sound sources detected through the sound source position detecting unit; and
   an endpoint determination unit configured to determine endpoints of the plurality of sound sources by use of the sound source maintenance time calculated by the sound source maintenance time calculating unit and the change in position of the sound sources according to each direction determined by the sound source position change determination unit.

2. The apparatus of claim 1, wherein the plurality of sound sources comprises speech from a speaker and a surrounding noise.

3. The apparatus of claim 2, wherein the speech from the speaker comprises speech from a plurality of speakers.

4. The apparatus of claim 1, wherein the sound source position detecting unit detects a position and number of the sound sources being input according to each direction from an environment in which the plurality of sound sources exists.

5. The apparatus of claim 4, further comprising a sound source position storage unit configured to store the position and number of the sound sources detected through the sound source position detecting unit together with time information.

6. The apparatus of claim 5, wherein the sound source position storage unit stores a position tracking result of each sound source about an existence and a length of the sound source being input according to each direction through the detection of the positions of the plurality of sound sources.

7. The apparatus of claim 6, wherein the sound course position change determination unit monitors a change in an angle of each sound source at a predetermined time interval by reading the position tracking result of each sound source being stored in the sound source position storage unit, and determines a change in the number of sound sources or a generation or an extinction of a sound source at a specific position.

8. The apparatus of claim 6, wherein the sound maintenance time calculating unit monitors a change in an angle of each sound source at a predetermined time interval by reading the position tracking result of each sound source being stored in the sound source position storage unit, and if the angle is changed, calculates a current time and a sound source maintenance time during which the angle is maintained.

9. The apparatus of claim 8, wherein the endpoint determination unit determines the endpoint of each sound source by interpreting a termination and a length of a sound source in a specific direction by use of a time, during which the sound source is maintained, from the current time.

10. A method of detecting endpoints of a plurality of sound signals from a plurality of sound sources, the method comprising:
  receiving, from a plurality of microphones, the sound signals from the plurality of sound sources;
  detecting positions of the plurality of sound sources from the received sound signals;
  monitoring a change in an angle of the sound sources at a predetermined time interval by reading the positions of the plurality of sound sources detected;
  calculating, if the angle is changed, a current time and a time during which the angle is maintained; and
  determining the endpoints of the plurality of sound sources by use of a time, during which a sound source in a specific direction is maintained, from the current time.

11. The method of claim 10, wherein the detecting of the positions of the plurality of sound sources comprises:
  detecting a position and number of sound sources being input according to each direction from an environment in which the plurality of sound sources exists.

12. The method of claim 11, further comprising storing the detected position and number of the sound sources together with time information.

13. The method of claim 12, further comprising storing a position tracking result of each sound source about an existence and a length of each sound source being input according to each direction by use of the position and number of the plurality of sound sources being stored together with the time information.

14. The method of claim 13, wherein the monitoring of the change in the angle comprises:
  monitoring a change in an angle of each sound source at a predetermined time interval by reading the stored position tracking result of each sound source; and
  determining a change in the number of the sound sources or a generation or an extinction of a sound source at a specific position.

15. The method of claim 14, wherein the calculating of the time during which the angle of each sound source is maintained comprises:
  calculating, if the angle of each sound source is changed, the current time and the time during which the angle of each sound source is maintained.

16. The method of claim 15, wherein the determining of the endpoints of the plurality of sound sources comprises:
  determining the endpoint of each sound source by interpreting a termination and a length of a sound source by use of a time, during which a sound source in a specific direction is maintained, from the current time.

17. A non-transitory computer-readable recording medium storing a program to implement the method of claim 10.

* * * * *